US008337927B2

(12) United States Patent
Purkayastha et al.

(10) Patent No.: US 8,337,927 B2
(45) Date of Patent: *Dec. 25, 2012

(54) PROCESS FOR MANUFACTURING A SWEETENER AND USE THEREOF

(75) Inventors: Siddhartha Purkayastha, Champaign, IL (US); Avetik Markosyan, Kuala Lumpur (MY); Magomet Malsagov, Kuala Lumpur (MY)

(73) Assignee: Purecircle SDN BHD, Negeri Sembilan (MY)

( * ) Notice: Subject to any disclaimer, the term of this patent is extended or adjusted under 35 U.S.C. 154(b) by 362 days.

This patent is subject to a terminal disclaimer.

(21) Appl. No.: 12/753,470

(22) Filed: Apr. 2, 2010

(65) Prior Publication Data

US 2010/0255171 A1 Oct. 7, 2010

Related U.S. Application Data

(63) Continuation-in-part of application No. 11/246,066, filed on Oct. 11, 2005, now Pat. No. 7,807,206, and a continuation-in-part of application No. 11/246,152, filed on Oct. 11, 2005, now Pat. No. 7,862,845, and a continuation-in-part of application No. 12/684,129, filed on Jan. 8, 2010, and a continuation-in-part of application No. 12/684,130, filed on Jan. 8, 2010, and a continuation-in-part of application No. 12/684,981, filed on Jan. 11, 2010, now Pat. No. 8,298,599, and a continuation-in-part of application No. 12/720,888, filed on Mar. 10, 2010.

(60) Provisional application No. 61/260,593, filed on Nov. 12, 2009, provisional application No. 61/290,778, filed on Dec. 29, 2009.

(51) Int. Cl.
*A23C 1/236* (2006.01)
(52) U.S. Cl. .......................... 426/548; 426/478; 426/489
(58) Field of Classification Search .................. 426/478, 426/479, 481, 489, 506, 548
See application file for complete search history.

(56) References Cited

U.S. PATENT DOCUMENTS

| | | | |
|---|---|---|---|
| 3,723,410 A | 3/1973 | Persinos | |
| 4,082,858 A | 4/1978 | Morita et al. | |
| 4,171,430 A | 10/1979 | Matsushita et al. | |
| 4,219,571 A | 8/1980 | Miyake | |
| 4,361,697 A | 11/1982 | Dobberstein et al. | |
| 4,599,403 A | 7/1986 | Kumar | |
| 4,892,938 A | 1/1990 | Giovanetto | |
| 5,112,610 A | 5/1992 | Kienle | |
| 5,779,805 A * | 7/1998 | Morano ........................... 127/42 |
| 5,962,678 A | 10/1999 | Payzant et al. | |
| 5,972,120 A | 10/1999 | Kutowy et al. | |
| 6,031,157 A | 2/2000 | Morita et al. | |
| 6,080,561 A | 6/2000 | Morita et al. | |
| 7,862,845 B2 * | 1/2011 | Magomet et al. ............. 426/548 |

| | | |
|---|---|---|
| 2006/0083838 A1 | 4/2006 | Jackson et al. |
| 2006/0134292 A1 | 6/2006 | Abelyan et al. |
| 2006/0142555 A1 | 6/2006 | Jonnala et al. |
| 2007/0082103 A1 | 4/2007 | Magomet et al. |
| 2007/0116800 A1 | 5/2007 | Prakash |
| 2007/0116819 A1 | 5/2007 | Prakash |
| 2007/0116820 A1 | 5/2007 | Prakash |
| 2007/0116821 A1 | 5/2007 | Prakash |
| 2007/0116822 A1 | 5/2007 | Prakash |
| 2007/0116823 A1 | 5/2007 | Prakash |
| 2007/0116824 A1 | 5/2007 | Prakash |
| 2007/0116825 A1 | 5/2007 | Prakash |
| 2007/0116826 A1 | 5/2007 | Prakash |
| 2007/0116827 A1 | 5/2007 | Prakash |
| 2007/0116828 A1 | 5/2007 | Prakash |
| 2007/0116829 A1 | 5/2007 | Prakash |
| 2007/0116830 A1 | 5/2007 | Prakash |
| 2007/0116831 A1 | 5/2007 | Prakash |
| 2007/0116832 A1 | 5/2007 | Prakash |
| 2007/0116833 A1 | 5/2007 | Prakash |
| 2007/0116834 A1 | 5/2007 | Prakash |
| 2007/0116835 A1 | 5/2007 | Prakash |
| 2007/0116836 A1 | 5/2007 | Prakash |
| 2007/0116837 A1 | 5/2007 | Prakash |
| 2007/0116838 A1 | 5/2007 | Prakash |
| 2007/0116839 A1 | 5/2007 | Prakash |
| 2007/0116840 A1 | 5/2007 | Prakash |
| 2007/0116841 A1 | 5/2007 | Prakash |
| 2007/0128311 A1 | 6/2007 | Prakash |
| 2007/0134390 A1 | 6/2007 | Prakash |
| 2007/0134391 A1 | 6/2007 | Prakash |
| 2007/0224321 A1 | 9/2007 | Prakash |

(Continued)

FOREIGN PATENT DOCUMENTS

BR PI0701736 7/2008

(Continued)

OTHER PUBLICATIONS

Chang, S. S. et al., "Stability Studies of Stevioside and Rebaudioside A in Carbonated Beverages", *Materials and Methods*, 1-6.
Chen, et al., "Enrichment and separation of rebaudioside A from stevia glycosides by a novel adsorbent with pyridyl group", *Science in China*, vol. 42, No. 3 1999, 277-282.
Chen, et al., "Selectivity of polymer adsorbent in adsorptive separations of stevia diterpene glycisides", *Science in China*, vol. 41, No. 4 1998, 436-441.
Chen, et al., "Studies on the adsorptive selectivity of the polar resin with carbonyl group on rebaudioside A", *Acta Polymeric Scnica*, No. 4 1999, 398-403.
Fuh, , "Purification of steviosides by membrane and ion exchange process", *Journal of Food Science*, vol. 55, No. 5 1990, 1454-1457.
Jaitak, et al., "An Efficient Microwave-assisted Extraction Process of Stevioside and Rebaudioside-A from *Stevia rebaudiana* (Bertoni)", *Phytochem. Anal.* vol. 20 2009, 240-245.

(Continued)

*Primary Examiner* — Leslie Wong
(74) *Attorney, Agent, or Firm* — Briggs and Morgan, P.A.; Aleya R. Champlin

(57) ABSTRACT

Highly purified Stevioside, Rebaudioside A and a purified sweet steviol glycoside mixture were prepared from sweet glycoside extracts obtained from *Stevia rebaudiana* Bertoni leaves. The resulting sweeteners are suitable as non-calorie, non-cariogenic, non-bitter, non-lingering sweeteners, which may be advantageously applied in foods, beverages, and milk products.

4 Claims, 3 Drawing Sheets

U.S. PATENT DOCUMENTS

| | | | |
|---|---|---|---|
| 2007/0292582 A1 | 12/2007 | Prakash et al. |
| 2008/0107775 A1 | 5/2008 | Prakash |
| 2008/0107776 A1 | 5/2008 | Prakash |
| 2008/0107787 A1 | 5/2008 | Prakash |
| 2008/0108710 A1 | 5/2008 | Prakash |
| 2008/0292765 A1 | 11/2008 | Prakash |
| 2008/0292775 A1 | 11/2008 | Prakash |
| 2008/0300402 A1 | 12/2008 | Yang et al. |
| 2009/0053378 A1 | 2/2009 | Prakash |

FOREIGN PATENT DOCUMENTS

| | | |
|---|---|---|
| CN | 1049666 | 3/1991 |
| CN | 1100727 | 3/1995 |
| CN | 1112565 | 11/1995 |
| CN | 1192447 | 9/1998 |
| CN | 1238341 | 12/1999 |
| CN | 1349997 | 5/2002 |
| CN | 101200480 | 6/2008 |
| JP | 52005800 | 1/1977 |
| JP | 52083731 | 7/1977 |
| JP | 52100500 | 8/1977 |
| JP | 52136200 | 11/1977 |
| JP | 54030199 | 3/1979 |
| JP | 54132599 | 10/1979 |
| JP | 55039731 | 3/1980 |
| JP | 55081567 | 6/1980 |
| JP | 55092400 | 7/1980 |
| JP | 55120770 | 9/1980 |
| JP | 55138372 | 10/1980 |
| JP | 55159770 | 12/1980 |
| JP | 55162953 | 12/1980 |
| JP | 56099768 | 8/1981 |
| JP | 56109568 | 8/1981 |
| JP | 56121453 | 9/1981 |
| JP | 56121454 | 9/1981 |
| JP | 56121455 | 9/1981 |
| JP | 56160962 | 12/1981 |
| JP | 57002656 | 1/1982 |
| JP | 57005663 | 1/1982 |
| JP | 57046998 | 3/1982 |
| JP | 57075992 | 5/1982 |
| JP | 57086264 | 5/1982 |
| JP | 58028246 | 2/1983 |
| JP | 58028247 | 2/1983 |
| JP | 358020170 | * 2/1983 |
| JP | 58212759 | 12/1983 |
| JP | 58212760 | 12/1983 |
| JP | 59045848 | 3/1984 |
| JP | 62166861 | 7/1987 |
| JP | 63173531 | 7/1988 |
| JP | 1131191 | 5/1989 |
| JP | 3262458 | 11/1991 |
| JP | 6007108 | 1/1994 |
| JP | 6192283 | 7/1994 |
| JP | 7143860 | 6/1995 |
| JP | 7177862 | 7/1995 |
| JP | 8000214 | 1/1996 |
| JP | 2002262822 | 9/2002 |
| RU | 2111969 | 5/1998 |
| RU | 2123267 | 12/1998 |
| RU | 2156083 | 9/2000 |
| RU | 2167544 | 5/2001 |
| RU | 2198548 | 2/2003 |
| WO | 2006072879 A1 | 7/2006 |
| WO | 2009108680 A2 | 9/2009 |

OTHER PUBLICATIONS

Kitahata, S. et al, "Production of Rubusoside Derivatives by Transgalactosylation of Various b-Galactosidases", *Agric. Biol. Chem.*, vol. 53, No. 11 1989, 2923-2928.

Kobayashi, et al., "Dulcoside A and B, New diterpene glycosides from *Stevia rebaudiana*", *Phytochemistry*, vol. 16 1977, 1405-1408.

Kohda, et al., "New sweet diterpene glucosides from *Stevia rebaudiana*", *Phytochemistry*, vol. 15 1976, 981-983.

Kovylyaeva, et al., "Glycosides from *Stevia rebaudiana*", *Chemistry of Natural Compounds*, vol. 43, No. 1 2007, 81-85.

Liu, et al., "Study of stevioside preparation by membrane separation process", *Desalination*, vol. 83 1991, 375-382.

Lobov, S. V. et al., "Enzymic Production of Sweet Stevioside Derivatives: Transglucosylation of Glucosidases", *Agric. Biol. Chem.*, vol. 55, No. 12 1991, 2959-2965.

Montovaneli, et al., "The effect of temperature and flow rate on the clarification of the aqueous Stevia-extract in fixed-bed column with zeolites", *Brazilian Journal of Chemical Engineering*, vol. 21, No. 3 2004, 449-458.

Moraes, et al., "Clarification of *Stevia rebaudiana* (Bert.) Bertoni extract adsorption in modified zeolites", *Acta Scientiarum*, vol. 23, No. 6 2001, 1375-1380.

Phillips, K. C., "Stevie: steps in developing a new sweetener", In T.H. Grenby, Editor, *Developments in Sweeteners-3, Elsevier* 1987, 1-43.

Pol, et al., "Comparison of two different solvents employed for pressurised fluid extraction of stevioside from *Stevia rebaudiana*: methanol versus water", *Anal Bioanal Chem* vol. 388 2007, 1847-1857.

Shi, et al., "Synthesis of bifunctional polymeric adsorbent and its application in purification of Stevia glycosides", *Reactive & Functional Polymers*, vol. 50 2002, 107-116.

Starratt, et al., "Rebaudioside F, a diterpene glycoside from *Stevia rebaudiana*", *Phytochemistry*, vol. 59 2002, 367-370.

Tanaka, O., "Improvement of taste of natural sweeteners", *Pure & Appl. Chem.*, vol. 69, No. 4 1997, 675-683.

Teo, et al., "Validation of green-solvent extraction combined with chromatographic chemical fingerprint to evaluate quality of *Stevia rebaudiana* Bertoni", *J. Sep. Sci*, vol. 32 2009, 613-622.

Yamamoto, K. et al., "Effective Production of Glycosyl-steviosides by a-1,6 Transglucosylation of Dextrin Dextranase", *Biosci. Biotech. Biochem.* vol. 58, No. 9 1994, 1657-1661.

Yoda, et al., "Supercritical fluid extraction from Stevia rebaudiana Bertoni using CO2 and CO2+ water: extraction kinetics and identification of extracted components", *Journal of Food Engineering*, vol. 57 2003, 125-134.

Zhang, et al., "Membrane-based separation scheme for processing sweetener from Stevia leaves", *Food Research International*, vol. 33 2000, 617-620.

Prakash et al., "Development of rebiana, a natural, non-caloric sweetener," Jul. 1, 2008, Food and Chemical Toxicology, vol. 46, Is. 7, Sup. 1, p. S75-S82.

International Search Report and Written Opinion for PCT/US2010/055960, mailed Jan. 25, 2011.

* cited by examiner

PROCESS FOR MANUFACTURING A SWEETENER AND USE THEREOF

RELATED APPLICATIONS

This application is a continuation-in-part application of and claims the benefit of priority of U.S. patent application Ser. No. 11/246,066, filed Oct. 11, 2005, now U.S. Pat. No. 7,807,206, issued on Oct 5, 2010; U.S. patent application Ser. No. 11/246,152, filed Oct. 11, 2005, now U.S. Pat. No. 7,862,845, issued on Jan. 4, 2011; U.S. patent application Ser. No. 12/684,129, filed Jan. 8, 2010; U.S. patent application Ser. No. 12/684,130, filed Jan. 8, 2010; U.S. patent application Ser. No. 12/684,981, filed Jan. 11, 2010, now U.S. Pat. No. 8,298,599; and U.S. patent application Ser. No. 12/720,888, filed on Mar. 10, 2010, the contents of which applications are incorporated by reference herein in their entireties. This application also claims the benefit of priority of U.S. Provisional Application Ser. No. 61/260,593, filed Nov. 12, 2009, and U.S. Provisional Application Ser. No. 61/290,778, filed Dec. 29, 2009, the contents of which applications are incorporated by reference herein in their entireties.

BACKGROUND OF THE INVENTION

1. Field of the Invention

The present invention relates to a process for producing a highly purified sweet steviol glycoside mixture, Stevioside and Rebaudioside A from the extract of the *Stevia rebaudiana* Bertoni plant and use thereof in various food products and beverages.

2. Description of the Related Art

In view of food sanitation, the use of artificial sweeteners such as dulcin, sodium cyclamate and saccharin has been restricted. However natural sweeteners have been receiving increasing demand. *Stevia rebaudiana* Bertoni is a plant that produces an alternative sweetener that has an added advantage of being a natural plant product. In addition, the sweet steviol glycosides have functional and sensory properties superior to those of many high potency sweeteners.

The extract of *Stevia rebaudiana* plant contains a mixture of different sweet diterpene glycosides, which have a single base—steviol and differ by the presence of carbohydrate residues at positions C13 and C19. These glycosides accumulate in *Stevia* leaves and compose approximately 10%-20% of the total dry weight. Typically, on a dry weight basis, the four major glycosides found in the leaves of *Stevia* are Dulcoside A (0.3%), Rebaudioside C (0.6%), Rebaudioside A (3.8%) and Stevioside (9.1%). Other glycosides identified in *Stevia* extract include Rebaudioside B, C, D, E, and F, Steviolbioside and Rubusoside.

The physical and sensory properties are well studied only for Stevioside and Rebaudioside A. They were tested for stability in carbonated beverages and found to be both heat and pH stable (Chang and Cook, 1983). The sweetness potency of Stevioside is around 210 times higher than sucrose, Rebaudioside A in between 200 and 400 times, and Rebaudioside C and Dulcoside A around 30 times (Phillips, 1989 and Tanaka, 1997).

However, apart from its high level of sweetness, they have also intrinsic properties of post-bitter taste and unpleasant and undesirable aftertaste. Some undesirable taste characteristics of glycosides can be as a result of contamination of other substances, presented in extract.

One of the main ways to improve the taste quality is the enzymatic glycosylation of mixture of semi-purified steviol glycosides. Another way is to produce highly purified individual glycosides with standard characteristics and minimal content of accompanying compounds.

The invention related to the purification of two main glycosides—Stevioside and Rebaudioside A and use thereof.

A process for the recovery of diterpene glycosides, including Stevioside from the *Stevia rebaudiana* plant is described (U.S. Pat. No. 4,361,697). A variety of solvents, having different polarities, were used in a sequential treatment that concluded with a high performance liquid chromatographic (HPLC) separation procedure.

A method for the recovery of Rebaudioside A from the leaves of *Stevia rebaudiana* plants has been developed (U.S. Pat. No. 4,082,858). Again, final purification is achieved by liquid chromatography subsequent to an initial extraction with water and an alkanol having from 1 to 3 carbon carbons, preferably methanol. It is also known that water may be used as the initial solvent; their preferred solvent at this stage is a liquid haloalkane having from 1 to 4 carbon atoms. The preferred second solvent is an alkanol having from 1 to 3 carbon atoms, while the preferred third solvent is an alkanol having from 1 to 4 carbon atoms and optionally minor amounts of water.

Individual sweet glycosides can be obtained from the *Stevia rebaudiana* plant. A mixture of sweet glycosides extracted from the *Stevia rebaudiana* plant is processed to remove impurities by using two types of ion-exchangers. After removing the mixed sweet glycosides from the second column with methanol, the solution is dried. Upon refluxing the dried solids in a methanol solution and then cooling the solution, Stevioside precipitates out. The filtrate is further concentrated and cooled to precipitate out Rebaudioside A. This Rebaudioside A can be further purified as can the previously obtained Stevioside (U.S. Pat. No. 5,962,678). However, a large amount of toxic organic solvent, such as methanol is used.

However, all the above-mentioned methods allow the production of Stevioside and Rebaudioside A not in highly purified grade, which further possess a residual bitterness and aftertaste.

On the other hand, the unfavorable taste of the glycosides can be as a result of contamination of impurities, presented in extract. Highly purified Stevioside and Rebaudioside A possessing an improved taste profile and there is a need to provide an easy and commercially valuable process for the manufacturing the highly purified Stevioside and Rebaudioside A, and use thereof in various beverages and food products.

SUMMARY OF INVENTION

An object of the present invention is to provide a commercially valuable process for producing a highly purified sweetener from the extract of *Stevia rebaudiana* Bertoni plant and use thereof in various food products and beverages, which overcomes the disadvantages of the related art.

The invention, in part, pertains to the dried and powdered leaves being subjected to water extraction and the resulted extracts is purified using treatment with a base such as calcium hydroxide and then iron chloride. The filtrate was deionized on, e.g., Amberlite FPC23H, Amberlite FPA51, and Amberlite FPA98Cl. The filtrate is concentrated under vacuum and spray dried. The isolation and purification of Stevioside and Rebaudioside A were developed using alcoholic precipitation and ultrafiltration. The highly purified Stevioside and Rebaudioside A were obtained. Any type of existing *Stevia* extract with various ratios of sweet steviol glycosides are feasible.

The highly purified glycosides were applied in various foods and beverages as sweetener.

The invention, in part, pertains to a purified sweet glycosides extract produced from the *Stevia rebaudiana* plant, wherein the main sweet glycosides are Rebaudioside A and Stevioside, obtained by a process including drying *Stevia rebaudiana* leaves, treating the leaves to extract an aqueous liquid solution containing mixed sweet steviol glycosides, extracting the *Stevia rebaudiana* leaves, obtaining an extract, filtering the extract, obtaining a filtrate, treating the filtrate with a base such as calcium hydroxide, treating the extract with trivalent iron chloride, desalting, decolorizing, and evaporating the filtrate to dryness.

In the invention, purified Rebaudioside A and Stevioside can be obtained by dissolving sweet steviol glycosides in methanol at ambient temperatures to precipitate Stevioside, filtering the solution to recover a precipitate of Stevioside, purifying, recovering a high purity Stevioside, concentrating the remaining solution and evaporating to dryness, suspending the powder in ethanol, heating and then cooling the solution to precipitate Rebaudioside A. Suspending the crystalline Rebaudioside A obtained in ethanol-water solution at cool conditions (10-12° C.) prepares a high purity of Rebaudioside A. Stevioside or Rebaudioside A has a purity of at least 98%. Applications are found in various foods such as chocolate, ice cream, beverage, dairy products, as a sweetener in a tablet form.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION

Figure 1:
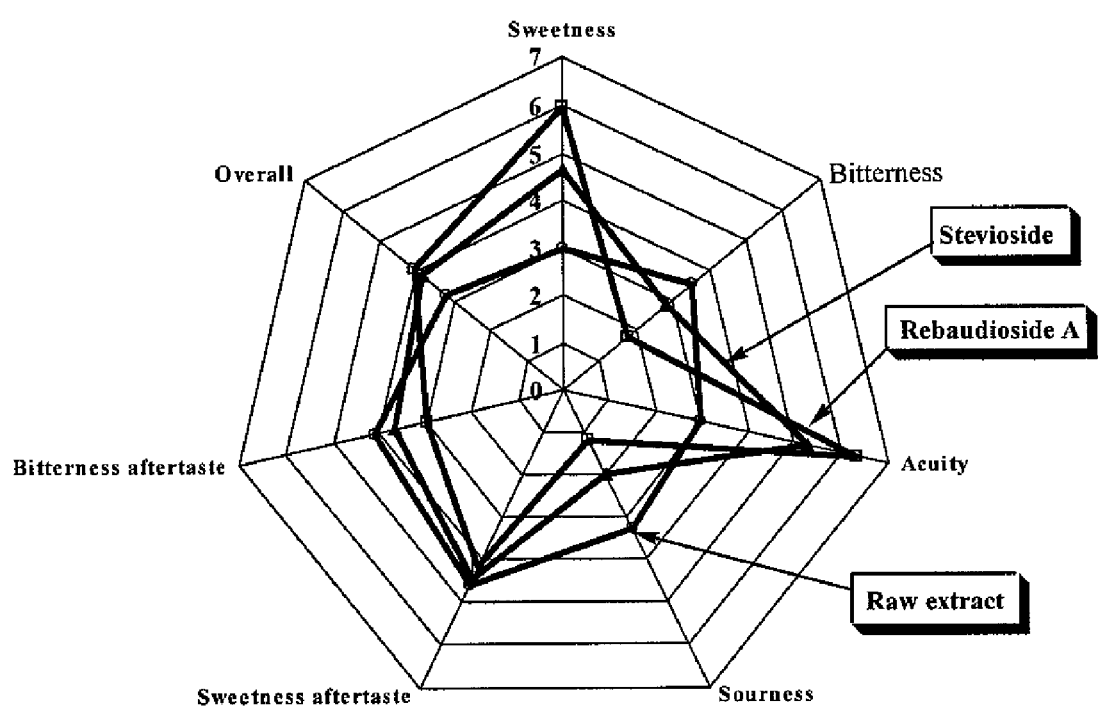
FIG. 1 shows a sensory evaluation of raw *Stevia* extract, Stevioside, and Rebaudioside A.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The dried leaves of *Stevia rebaudiana* Bertoni were extracted by 10 volumes of water. The proportion of extraction water preferably was about 5 liters to about 15 liters (pH 6.0 to 7.0) to one kilogram of leaves. Greater volumes of solvent can be used, however, it was not preferable from the practical standpoint. The duration of extraction may be from 0.5 hours to 24 hours, with a period of from about 1 hours to about 6 hours preferred.

The extraction temperature can be in the limits of 25-90° C., however the temperatures between 45-75° C. are more preferable.

The plant material was separated from the solution by filtration, and the pH of the filtrate was adjusted to about 10 with calcium hydroxide and heated between 40-60° C., preferably from 50° C. to 55° C., for about 0.5-1.0 hours, cooled to ambient temperature with slow agitation, and neutralized by $FeCl_3$. After mixing for 10-15 minutes, the precipitate was removed by filtration; the filtrate was passed through the Celite, deionized, and decolorized by Amberlite FPC23H, Amberlite FPA51, and Amberlite FPA98Cl by conventional manner. The solution was concentrated and spray dried.

The resulting sweet steviol glycoside mixture was a yellow powder and had a content of 3.4% Dulcoside, 64.6% Stevioside, 6.7% Rebaudioside C and 25.3% Rebaudioside A.

An HPLC analysis of the obtained product was carried out using an Agilent Technologies 1100 Series (USA) equipped with Zorbax-$NH_2$ column using acetonitrile-water gradient from 80:20, v/v (2 minutes) to 50:50, v/v during 70 minutes and UV detector at 210 nm.

The obtained powder was dissolved in methanol and maintained at a temperatures 20-50° C., preferably at 20-25° C., for 0.5-6.0 hours, preferably 0.5-1.0 hours with agitation. The proportion of extract and methanol was between 1:2-1:7, w/v, preferably 1:5. During this time the precipitate was formed, which was filtered and dried. According to the HPLC analysis, the powder contents were around 90-91% of Stevioside. A second treatment by methanol was not efficient to prepare high purity Stevioside.

For the further purification, the powder was mixed with two volumes of 90% of ethanol and at 10-12° C. and maintained for about 30 minutes with slow agitation. The precipitate was separated by filtration and dried under vacuum. The Stevioside with about 98.5-99.4% purity was obtained.

The filtrates were combined and used for recovery of Rebaudioside A. For this purpose the remaining solution was evaporated to remove the methanol, the syrup obtained diluted with water and passed through polysulfone based ultrafiltration membranes (with a filtering discrimination of 2.5 kDa) (Liumar Technologies, Ottawa, Canada) with diafiltration. The filtrate was concentrated and spray dried. The obtained powder was mixed with 96.2% ethanol and maintained at 45-50° C. for about 30 minutes with agitation. The proportion of syrup and ethanol was between 1:2-1:7, w/v, preferably 1:5. During this time the precipitate was formed, which was filtered and dried. Rebaudioside A with 88-90% purity was obtained. For the further purification the powder was mixed with two volumes of 92% ethanol and maintained at 10-12° C. for about 60 minutes with slow agitation. The crystals were filtered and dried. Rebaudioside A with 98.9% purity was obtained.

Based on the results of preliminary test on the sweetening power of the sweeteners, aqueous solutions of commercial *Stevia* extract (0.05%) commercialized by Ganzhou Julong High-Tech Food Industry Co., Ltd (China), Stevioside (0.07%), and Rebaudioside A (0.028%) were prepared.

The organoleptic test was carried out with 30 previously trained panel members. It was observed that Rebaudioside A has the highest sweetness level (5.96), followed by Stevioside with a mean score of 4.62, and commercial *Stevia* extract had the lowest mean score of 2.96. Rebaudioside A had the lowest score for bitterness (1.76), and commercial *Stevia* extract was the most bitter compared to the other samples. For overall acceptability, Rebaudioside A had the highest score of 4.05 followed by Stevioside (3.81) and raw extract (3.16) (FIG. 1).

Figure 2:
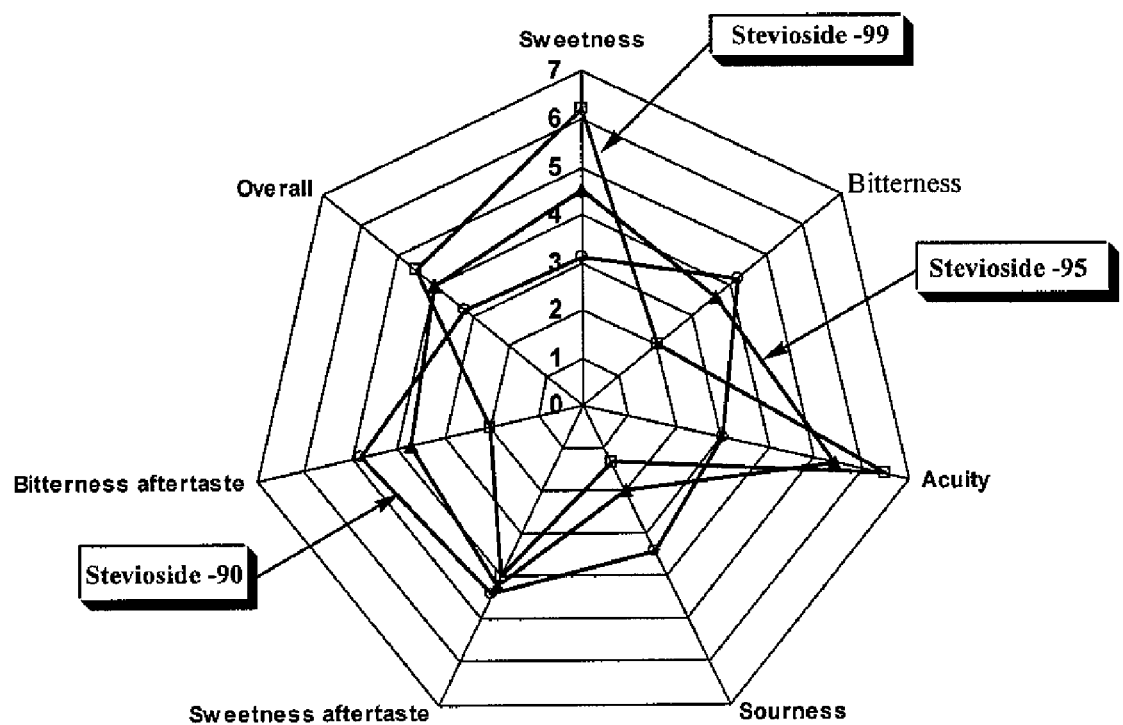
FIG. 2 shows a sensory evaluation of Stevioside with a different grade of purity.
Figure 3:
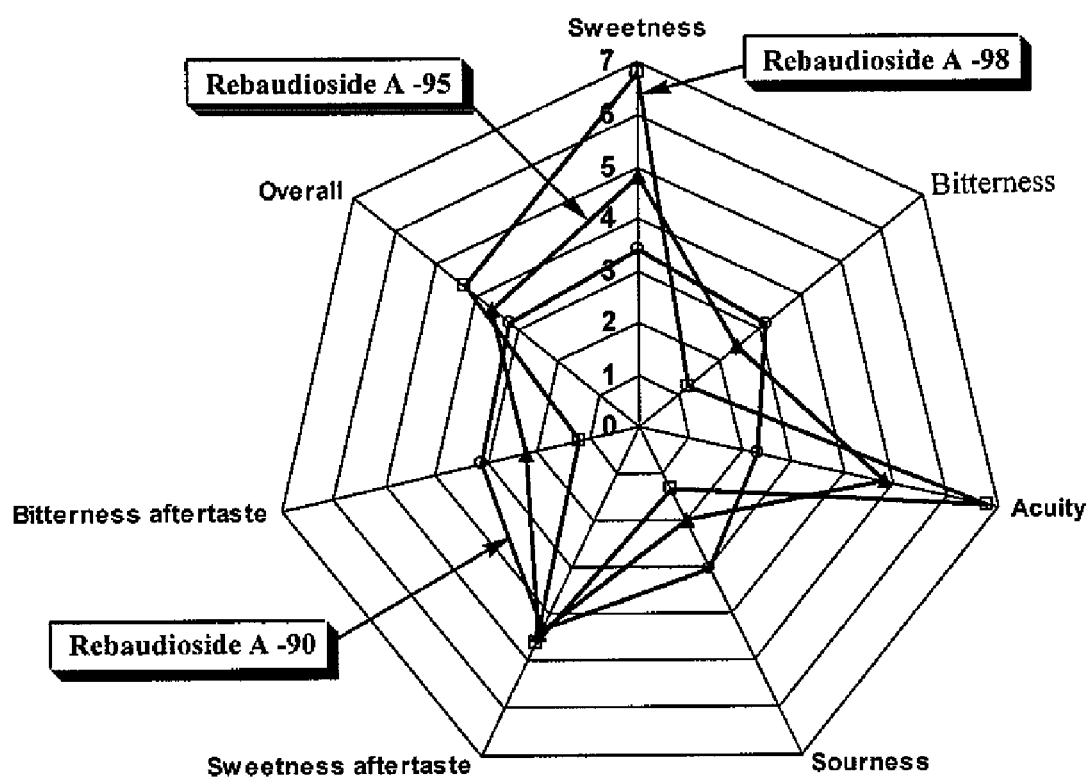
FIG. 3 shows a sensory evaluation of Rebaudioside A with a different grade of purity.

The taste profile of Stevioside with 99.3% of purity was more preferable as compared with 90.2 and 95.4% (FIG. 2). The similar feature was obtained for Rebaudioside A with various grades of purity (FIG. 3).

The highly purified sweeteners can be favorably used for seasoning various food products (for instance, soy sauce, soy sauce powder, soy paste, soy paste powder, dressings, mayonnaise, vinegar, powdered vinegar, bakery products and confectioneries, frozen-desserts, meat products, fish-meat products, potato salad, bottled and canned foods, fruit and vegetables) in intact or mixed forms with other sweeteners, such as corn syrup, glucose, maltose, sucrose, lactose, aspartame, saccharin, sugar alcohols, organic and amino acids, flavors and/or coloring agents.

The products are favorably usable as a low-cariogenic and low-calorie sweetener because it is less fermentable by oral dental-caries causative microorganisms. Exemplary applications include low-cariogenic food products such as confectioneries including chewing gum, chocolate, biscuits, cookies, toffee and candy. Additionally applications include soft drinks such as coffee, cocoa, juice, carbonated drinks, sour milk beverage, yogurt drinks and alcoholic drinks, such as brandy, whisky, vodka and wine. In addition to the above-described uses, the sweeteners are usable for sweetening drugs and cosmetics.

The following examples illustrate preferred embodiments of the invention.

EXAMPLE 1

Extraction of Sweet Steviol Glycosides

The leaves of *Stevia rebaudiana* are dried at 55° C. for three hours in a vacuum oven and powdered (30 mesh). One kg of the obtained material was mixed with 10 liters of water (pH 6.5) and heated to 55° C. with slow agitation for 10 hours. The plant material was separated from the solution by filtration and the pH of the filtrate was adjusted to 10 with about 24 grams of calcium hydroxide and heated to 50° C. for 0.5 hours. The obtained mixture was cooled to ambient temperature and the pH was adjusted to about 7.0 by about 53 grams of $FeCl_3$. After mixing for 15 minutes the precipitate was removed by filtration.

The slightly yellow filtrate was passed through the Celite, deionized, and decolorized by conventional manner on Amberlite FPC23H, Amberlite FPA51, and Amberlite FPA98Cl commercialized by ROHM & HAAS Co., Germany. The solution was concentrated and spray dried. The yield was 122 grams of powder with a content of sweet glycosides of about 91%. The sweet steviol glycoside mixture contains 3.4% Dulcoside, 64.6% Stevioside, 6.7% Rebaudioside C and 25.3% Rebaudioside A. In another embodiment, a sweet steviol glycoside mixture with a purity of at least about 95% was obtained. In a further embodiment, a sweet steviol glycoside mixture with a purity of at least about 98% was obtained.

EXAMPLE 2

Preparation of Stevioside 100 grams (on the base of dry material) of the sweet steviol glycoside powder obtained by the process of EXAMPLE 1 was mixed with 0.5 liters of methanol and maintained at 25° C. for 45 minutes with slow agitation. The precipitate Stevioside was filtered and dried. 61.2 grams of Stevioside with 90.6% purity was obtained.

For the further purification the powder was mixed with two parts of 90% of ethanol, and maintained at 10-12° C. for about 30 minutes with slow agitation. The precipitate was separated by filtration and dried under vacuum. The product weighed 58.8 grams and contained 99.3% Stevioside. In another embodiment, Stevioside with a purity of at least about 98% was obtained.

EXAMPLE 3

Preparation of Rebaudioside A

The remaining solutions after separation of Stevioside (EXAMPLE 2) were combined, and methanol was removed by evaporation. The syrup was diluted with water and passed through polysulfone based ultrafiltration membranes (with a filtering discrimination of 2.5 kDa) (Liumar Technologies, Ottawa, Canada) with diafiltration. The filtrate was concentrated and spray dried. 40.8 grams of powder with content of Rebaudioside A of around 60% were obtained. The powder was mixed with five volumes (w/v) of 96.2% ethanol and maintained at 50° C. for 30 minutes with slow agitation. The precipitate was filtered and dried. Rebaudioside A with 89.8% purity was obtained. The powder was mixed with two volumes of 92% of ethanol and maintained at 12° C. for 60 minutes with slow agitation. The crystals were filtered and dried. 23.6 grams of Rebaudioside A of 98.9% purity was obtained. In another embodiment, Rebaudioside A with a purity of at least about 98% was obtained.

EXAMPLE 4

Low-Calorie Orange Juice Drink

Orange concentrate (35%), citric acid (0.38%), ascorbic acid (0.05%), sodium benzoate (0.02%), orange red color (0.01%), orange flavor (0.20%), and sweetener (0.06%) containing 90.2, 95.4 or 99.3% of Stevioside, or 80, 90, or 98.9% of Rebaudioside A were blended and dissolved completely in the water (up to 100%) and pasteurized. The sensory evaluation of the samples is summarized in the TABLE 1. The data shows that best results were obtained for highly purified Rebaudioside A and Stevioside.

TABLE 1

| | Comments | | |
| --- | --- | --- | --- |
| Sample | Flavor | Aftertaste | Mouth feel |
| Stevioside - 90.2% | Sweet and balanced flavor | Slight bitterness in aftertaste | Acceptable |
| Stevioside - 95.4% | Sweet and balanced flavor | Slight bitterness in aftertaste | Acceptable |
| Stevioside - 99.3% | Sweet, pleasant, balanced flavor | Clean, no bitterness | Quite full |
| Rebaudioside A - 80.0% | Sweet, rounded and balanced Flavor | Almost no any bitterness | Acceptable |
| Rebaudioside A - 90.0% | Sweet, rounded and balanced Flavor | Almost no any bitterness | Full |
| Rebaudioside A - 98.9% | High quality of sweetness, pleasant, taste similar to sucrose, balanced flavor | Clean, no unpleasant aftertaste | Quite full |

By the same way can be prepared juices from other fruits, such as apple, lemon, apricot, cherry, pineapple, etc.

EXAMPLE 5

Low-Calorie Carbonated Lemon-Flavored Beverage
The formula for the beverage was as below:

| Ingredients | Quantity, kg |
| --- | --- |
| Sugar | 30.0 |
| Sweetener | 0.4 |
| Citric acid | 2.5 |

| Ingredients | Quantity, kg |
| --- | --- |
| Green tea extract | 25.0 |
| Salt | 0.3 |
| Lemon tincture | 10.0 L |
| Juniper tincture | 8.0 L |
| Sodium benzoate | 0.17 |
| Carbonated water | up to 1000 L |

Sensory and physicochemical characteristics of the drink are presented in the TABLE 2.

The drinks with highly purified Rebaudioside A and Stevioside were superior with an excellent flavor and taste.

TABLE 2

| | Characteristics | | | |
| --- | --- | --- | --- | --- |
| Item | Stevioside - 90.2% | Stevioside - 99.3% | Rebaudioside A - 90.0% | Rebaudioside A - 98.9% |
| Appearance | Transparent liquid, free of sediment and strange impurities. A light opalescence, caused by features of used raw materials is possible. | Transparent liquid, free of sediment and strange impurities. A light opalescence, caused by features of used raw materials is possible. | Transparent liquid, free of sediment and strange impurities. A light opalescence, caused by features of used raw materials is possible. | Transparent liquid, free of sediment and strange impurities. A light opalescence, caused by features of used raw materials is possible. |
| Color | From light yellow up to Yellow | From light yellow up to yellow | From light yellow up to yellow | From light yellow up to yellow |
| Taste | Sour-sweet, some bitterness in aftertaste | Sour-sweet, expression of sweetness is rapid. The taste is satisfactory. | Sour-sweet, almost no any bitterness, expression of sweetness is rapid. | Sour-sweet, expression of sweetness is rapid. |

EXAMPLE 6

Low-Calorie Carbonated Drink
The formula for the beverage was as below:

| Ingredients | Quantity, % |
| --- | --- |
| Cola flavor | 0.340 |
| Phosphoric acid (85%) | 0.100 |
| Sodium citrate | 0.310 |
| Sodium benzoate | 0.018 |
| Citric acid | 0.018 |
| Sweetener | 0.030 |
| Carbonated water | to 100 |

The beverages prepared with different sweeteners were given to 10 judges for comparison.
TABLE 3 shows the results.

TABLE 3

| | Number of panelists | | | |
| --- | --- | --- | --- | --- |
| Comparison Point | Stevioside- 90.2% | Stevioside- 99.3% | Rebaudioside A 90.0% | Rebaudioside A 98.9% |
| Bitter taste | 6 | 2 | 3 | 0 |
| Astringent taste | 6 | 2 | 3 | 0 |
| Aftertaste | 6 | 2 | 3 | 0 |

TABLE 3-continued

| Comparison Point | Stevioside- 90.2% | Stevioside- 99.3% | Rebaudioside A 90.0% | Rebaudioside A 98.9% |
|---|---|---|---|---|
| | Number of panelists | | | |
| Quality of sweet taste | Sweet, bitterness in aftertaste (6 of the 10 judges) | Clean (7 of the 10 judges) | Sweet, some bitterness in aftertaste (5 of the 10 judges) | Clean (10 of the 10 judges) |
| Overall evaluation | Satisfactory (5 of the 10 judges) | Satisfactory (8 of the 10 judges) | Satisfactory (8 of the 10 judges) | Satisfactory (10 of the 10 judges) |

The above results show that the beverages prepared using highly purified Stevioside and Rebaudioside A possessing good organoleptic characteristics.

EXAMPLE 7

Chocolate

A composition containing 30 kg of cacao liquor, 11.5 kg of cacao butter, 14 kg of milk powder, 44 kg of sorbitol, 0.1 kg of salt, and 0.1 kg of sweetener prepared according to the EXAMPLES 2 or 3, was kneaded sufficiently, and the mixture was then placed in a refiner to reduce its particle size for 24 hours. Thereafter, the content was transferred into a conche, 300 grams of lecithin was added, and the composition was kneaded at 50° C. for 48 hours. Then, the content was placed in a shaping apparatus, and solidified.

The products are low-cariogenic and low-calorie chocolate with excellent texture. Also, the organoleptic test carried out with 20 panelists revealed no lingering after-taste. The most desirable ones were the products with Rebaudioside-98.9% (19 members) and Stevioside 99.3% (16 members).

EXAMPLE 8

Ice-Cream 1.50 kg of whole milk were heated to 45° C., and 300 grams of milk cream, 100 grams of tagatose, 90 grams of sorbitol, 6 grams of carrageenan as a stabilizer, 3 grams of polysorbate-80 as an emulsifier, and 1.0 gram of sweetener prepared according to the EXAMPLES 2 or 3, were added into the milk and was stirred until the ingredients completely dissolved. The mixture then was pasteurized at a temperature of 80° C. for 25 seconds. The homogenization of the obtained mixture was carried out at a pressure of 800 bars and the samples were kept at a temperature of 4° C. for 24 hours to complete the aging process. Vanilla flavor (1.0% of the mixture weight) and coloring (0.025% of the mixture weight) are added into the mixture after aging. The mixture was then transferred to ice cream maker to produce ice cream automatically. Samples of ice creams produced were transferred to seal containers and were kept in the freezer at a temperature of −18° C.

The application of sweeteners does not affect the physico-chemical properties of ice cream, as well as the overall attributes of color, smoothness, surface texture, air cell, vanilla aroma intensity, vanilla taste, chalkiness, iciness and melting rate. Organoleptic test carried out with 20 panelists. The most desirable ones were the products with 98.9% Rebaudioside A (18 members) and 99.3% Stevioside (14 members).

EXAMPLE 9

Yogurt

In 5 kg of defatted milk, 4.0 grams of sweetener, prepared according to EXAMPLES 2 and 3, were dissolved. After pasteurizing at 82° C. for 20 minutes, the milk was cooled to 40° C. A starter in amount of 150 grams was added and the mixture was incubated at 37° C. for 6 hours. Then, the fermented mass was maintained at 10-15° C. for 12 hours.

The product is a low-calorie and low-cariogenic yoghurt without foreign taste and odor.

EXAMPLE 10

Table Top Tablet

A mixture, consisting of 58.5% lactose, 10% calcium silicate, 5% cross-carmellose, 5% L-leucine, 1% aerosol 200, 0.5% magnesium stearate, and 20% of a sweetener, obtained according to the EXAMPLE 2 or 3, was kneaded sufficiently. Then the mixture was shaped with the use of a tabletting machine, equipped with punchers of 6.2 mm diameter, into tablets of 70 mg each, 3.0 mm thick, and 10±1 kg hardness The tablets can be easily administrated due to their appropriate sweetness. However, the formulations using low grade of Stevioside and Rebaudioside A were somewhat sticky with solubility about 3-4 minutes in water at 25° C. The tablets, prepared with highly purified Rebaudioside A show the best characteristics with the solubility around 20-30 seconds.

EXAMPLE 11

Tooth Paste

A tooth paste was prepared by kneading a composition comprising of calcium phosphate, 45.0%; carboxymethylcellulose, 1.5%; carrageenan, 0.5%; glycerol, 18.0%; polyoxyethylene sorbitan mono-ester, 2.0%; beta-cyclodextrin, 1.5%; sodium laurylsarcosinate, 0.2%; flavoring, 1.0%; preservative, 0.1%; Rebaudioside A or Stevioside, obtained according to the EXAMPLE 2 or 3, 0.2%; and water to 100%, by usual way. The product possesses good foaming and cleaning abilities with appropriate sweetness.

EXAMPLE 12

Soy Sauce 0.8 g of Rebaudioside A/Stevioside mixture (1:1, w/w) obtained according to the invention was added to 1000 mL of soy sauce and mixed homogenously. The products had an excellent taste and texture.

EXAMPLE 13

Bread 1 kg of wheat flour, 37.38 grams of fructooligosaccharide syrup, 80 grams of margarine, 20 grams of salt, 20 grams of yeasts, and 0.25 grams of high purity Rebaudioside A or Stevioside, obtained according to the EXAMPLE 2 or 3 were placed into the blender and mixed well. 600 ml of water was poured into the mixture and kneaded sufficiently. At the completion of the kneading process, the dough was shaped and raised for 30 to 45 minutes. The ready dough was placed in oven and baked for 45 minutes. Bread samples had creamy white color, and smooth texture.

EXAMPLE 14

Diet Cookies

Flour (50.0%), margarine (30.0%), fructose (10.0%), maltitol (8.0%), whole milk (1.0%), salt (0.2%), baking powder (0.15%), vanillin (0.1%), Rebaudioside A or Stevioside (0.55%), obtained according to this invention were kneaded well in dough-mixing machine. After molding of the dough the cookies were baked at 200° C. for 15 minutes.

The product is a low-calorie diet cookie with excellent taste and appropriate sweetness.

EXAMPLE 15

Cake 123 g of hen eggs, 45 g of sugar, 345 g of sorbitol liquid, 2.0 g of sucrose fatty acid ester, 0.35 g of Rebaudioside A or Stevioside was mixed with 100 g of wheat flour and 200 g of water in order to prepare a cake according to a conventional method. The product had an excellent taste with an optimal sweet flavor.

The following examples describe a process to make a sucrose-based sweetener with stevia-based sweeteners having improved taste, mouthfeel and flavor properties. Because sucrose and stevia-based sweeteners have very different melting characteristics and solubility, conventional co-crystallization techniques would not result in a suitable product. For example, while sugar is about 66% soluble in water, Rebaudioside A is only about 1% soluble, and *Stevia* 95 (containing steviol glycosides at 95% purity) is only about 34% soluble in water. Sugar has a melting point of about 186° C., while Rebaudioside A has a melting point of about 240° C., and *Stevia* 95 is mostly amorphous. Because of these and other disparities, conventional processes would not lead to a suitable product.

Instead, the following process was developed to overcome the difficulties associated with working with sweetening components having such different properties. The resulting low-calorie sweetener can be used in any food, beverage or consumer healthcare product. Other ingredients can be incorporated into the low-calorie sweetener using this process, including but not limited to sugar, salt, vitamins, minerals, supplements, homeopathic agents, preservatives, citric acid, juniper tincture, ascorbic acid, sodium benzoate, colorings, flavorings, and a combination thereof.

Although the processes described in the following Examples make references to the sweeteners made in Examples 1-3, it is to be understood that these processes can be used with any stevia-based sweeteners, including but not limited to Rebaudioside A, Stevioside, and purified sweet steviol glycoside mixtures, made by using any process, including the enzymatic transglycosylation processes described in co-pending U.S. patent application Ser. Nos. 11/246,066, 12/684,129 and 12/684,130, the entire contents of which are incorporated by reference herein. The processes described in these co-pending applications involve an enzymatic transglycosylation process using CGTases (cyclodextrin glycosyltransferase) produced by cultures of *Bacillus stearothermophilus* to produce stevia-based sweeteners, including, but not limited to, Steviosides, Rebaudioside A and purified sweet steviol glycoside mixtures.

EXAMPLE 16

Sugar (Sucrose) Based Liquid Sweetener with Rebaudioside A 100 g of Rebaudioside A obtained according to EXAMPLE 3 and 26 kg of sucrose were dissolved in 26.2 L of water to make a solution about 50% w/w total solids content. The obtained solution was evaporated under vacuum at 60° C. to prepare a syrup with total solids content of 68% w/w.

The produced liquid sweetener is clear colorless syrup having a taste profile identical to sucrose, with sweetness power about or at least about 2 times higher than sugar.

In one embodiment similar sweetener was prepared using stevioside obtained according to EXAMPLE 2 and yet in another embodiment sweetener was prepared using steviol glycosides obtained according to EXAMPLE 1.

EXAMPLE 17

Invert Sugar Based Liquid Sweetener with Rebaudioside A 100 g of Rebaudioside A obtained according to EXAMPLE 3 and 44.6 kg of granulated sugar and 5.7 kg invert sugar syrup with 65% total solids content were dissolved in 46.3 L of water to make a solution with about 50% w/w total solids content. The obtained solution was evaporated under vacuum at 60° C. to prepare a syrup with total solids content of 70% w/w.

The produced liquid sweetener is clear colorless syrup having taste profile identical to sucrose, with sweetness power about or at least about 2 times higher than sugar.

In one embodiment similar sweetener was prepared using stevioside obtained according to EXAMPLE 2 and in yet in another embodiment sweetener was prepared using steviol glycosides obtained according to EXAMPLE 1.

EXAMPLE 18

Corn Syrup Based Liquid Sweetener with Rebaudioside A 100 g of Rebaudioside A obtained according to EXAMPLE 3 and 65 kg of corn syrup with 77% total solids content were dissolved in 35 L of water to make a solution with 50% w/w total solids content. The obtained solution was evaporated under vacuum at 60° C. to prepare a syrup with total solids content of 80% w/w.

The produced liquid sweetener is clear colorless syrup having taste profile identical to sucrose, with sweetness power about or at least about 2 times higher than sugar.

In one embodiment similar sweetener was prepared using stevioside obtained according to EXAMPLE 2 and in yet in another embodiment sweetener was prepared using steviol glycosides obtained according to EXAMPLE 1.

In one embodiment, the dry weight ratio of sucrose to the sweet steviol glycoside mixture, stevioside or rebaudioside A is in the range of about 50:1 to about 300:1 (w/w). Examples of other ratios of sucrose to steviol glycosides ("*Stevia*95" which contains 95% total steviol glycosides), stevioside or rebaudioside A (Reb A) suitable for the present invention are summarized in Table 4. As used in the Table 4, "Calorie Reduction" refers to the reduced calories of the sweetener as compared to 100 kg of pure sugar. Each of the following blends provides the equivalent sweetness of 100 kg of sugar.

TABLE 4

| Calorie Reduction | Sugar (kg) | RebA Weight (kg) | Sugar to RebA ratio | Stevioside Weight (kg) | Sugar to Stevioside ratio | "Stevia 95" Steviol glycoside mixture Weight (kg) | Sugar to Stevia 95 ratio |
|---|---|---|---|---|---|---|---|
| 25% | 75 | 0.096 | 780 | 0.132 | 570 | 0.119 | 630 |
| 35% | 65 | 0.135 | 483 | 0.188 | 345 | 0.167 | 390 |
| 50% | 50 | 0.192 | 260 | 0.278 | 180 | 0.238 | 210 |
| 75% | 25 | 0.357 | 70 | 0.480 | 52 | 0.429 | 58 |

In one embodiment, the dry weight ratio of the combined granulated and invert sugar syrup to the sweet steviol glycoside mixture, stevioside or rebaudioside A is in the range of about 50:1 to about 300:1 (w/w). Examples of other dry weight ratios of invert sugar syrup to steviol glycosides ("Stevia95" which contains 95% total steviol glycosides), stevioside or rebaudioside A (Reb A) suitable for the present invention are summarized in Table 5. As used in the Table 5, "Calorie Reduction" refers to the reduced calories of the sweetener as compared to 100 kg of dried invert sugar syrup. Each of the following blends provides the equivalent sweetness of 100 kg of dried invert sugar syrup.

TABLE 5

| Calorie Reduction | Sugar (Kg) | Invert Sugar Syrup (kg) | RebA Weight (kg) | Total Sugar to RebA ratio | Stevioside Weight (kg) | Total Sugar to Stevioside ratio | "Stevia 95" Steviol glycoside mixture Weight (kg) | Invert Sugar to Stevia 95 ratio |
|---|---|---|---|---|---|---|---|---|
| 25% | 70 | 7.7 | 0.096 | 780 | 0.132 | 570 | 0.119 | 630 |
| 35% | 60 | 7.7 | 0.135 | 483 | 0.188 | 345 | 0.167 | 390 |
| 50% | 44 | 9.2 | 0.192 | 260 | 0.278 | 180 | 0.238 | 210 |
| 75% | 23 | 3 | 0.357 | 70 | 0.480 | 52 | 0.429 | 58 |

In one embodiment, the weight ratio of corn syrup, containing 77% dry-solid, to the sweet steviol glycoside mixture, stevioside or rebaudioside A is in the range of about 50:1 to about 300:1 (w/w). Examples of other ratios of corn syrup to either steviol glycosides ("Stevia95" which contains 95% total steviol glycosides), stevioside or rebaudioside A (Reb A) suitable for the present invention are summarized in Table 6. As used in the Table 6, "Calorie Reduction" refers to the reduced calories of the sweetener as compared to 100 kg of dried corn syrup. Each of the following blends provides the equivalent sweetness of 100 kg of dried corn syrup.

TABLE 6

| Calorie Reduction | Corn Syrup (kg) | RebA Weight (kg) | Corn Syrup to RebA ratio | Stevioside Weight (kg) | Corn Syrup to Stevioside ratio | "Stevia 95" Steviol glycoside mixture Weight (kg) | Corn Syrup to Stevia 95 ratio |
|---|---|---|---|---|---|---|---|
| 25% | 98 | 0.096 | 1020 | 0.132 | 742 | 0.119 | 824 |
| 35% | 84 | 0.135 | 622 | 0.188 | 447 | 0.167 | 503 |
| 50% | 65 | 0.192 | 338 | 0.278 | 234 | 0.238 | 273 |
| 75% | 33 | 0.357 | 92 | 0.480 | 69 | 0.429 | 77 |

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

What is claimed is:

1. A process for producing a liquid low-calorie sweetener composition, comprising the steps of:
   a) drying *Stevia rebaudiana* leaves;
   b) treating the dried *Stevia rebaudiana* leaves with water to extract sweet glycosides, wherein a leaves-water mixture is formed;
   c) filtering the leaves-water mixture to obtain an aqueous filtrate;
   d) directly treating the aqueous filtrate with calcium hydroxide or calcium oxide to raise the pH of the aqueous filtrate to about 10;
   e) directly neutralizing the treated aqueous filtrate with trivalent iron chloride; and
   f) filtrating the neutralized aqueous filtrate to obtain a filtrated aqueous filtrate, and evaporating the filtrated aqueous filtrate to dryness to obtain purified sweet glycosides to provide a high intensity sweetener;
   g) providing sugar granules as a low intensity sweetener;
   h) dissolving the high intensity sweetener and low intensity sweetener in water to obtain a solution with 45-55% total solids; and
   i) evaporating the solution of high intensity sweetener and low intensity sweetener under vacuum to obtain the liquid low-calorie sweetener composition with a total solids content of about 60% to about 90%.

2. The process claim 1, wherein a dry weight ratio of the low intensity sweetener to high intensity sweetener is in the range of about 50:1 to about 300:1 (w/w).

3. The process of claim 1, wherein the purified sweet glycosides obtained in step (f) are dissolved in methanol at temperatures ranging from about 20-50° C., in an amount of 1:2-1:7 (w/v) to precipitate Stevioside from solution, filtering the solution to recover Stevioside precipitate, suspending the precipitate in an alcohol-water solution to further purify the Stevioside, and recovering the higher purity of Stevioside with a purity of at least 98% to provide the high intensity sweetener.

4. The process of claim 3, further comprising the steps of combining remaining alcohol solutions, removing the alcohol, ultrafiltering to obtain a filtrate, recovering Rebaudioside A, mixing the Rebaudioside A with dilute alcohol, and filtering and drying to result in Rebaudioside A with a purity of at least 98% to provide the high intensity sweetener.

* * * * *